Figure 1:
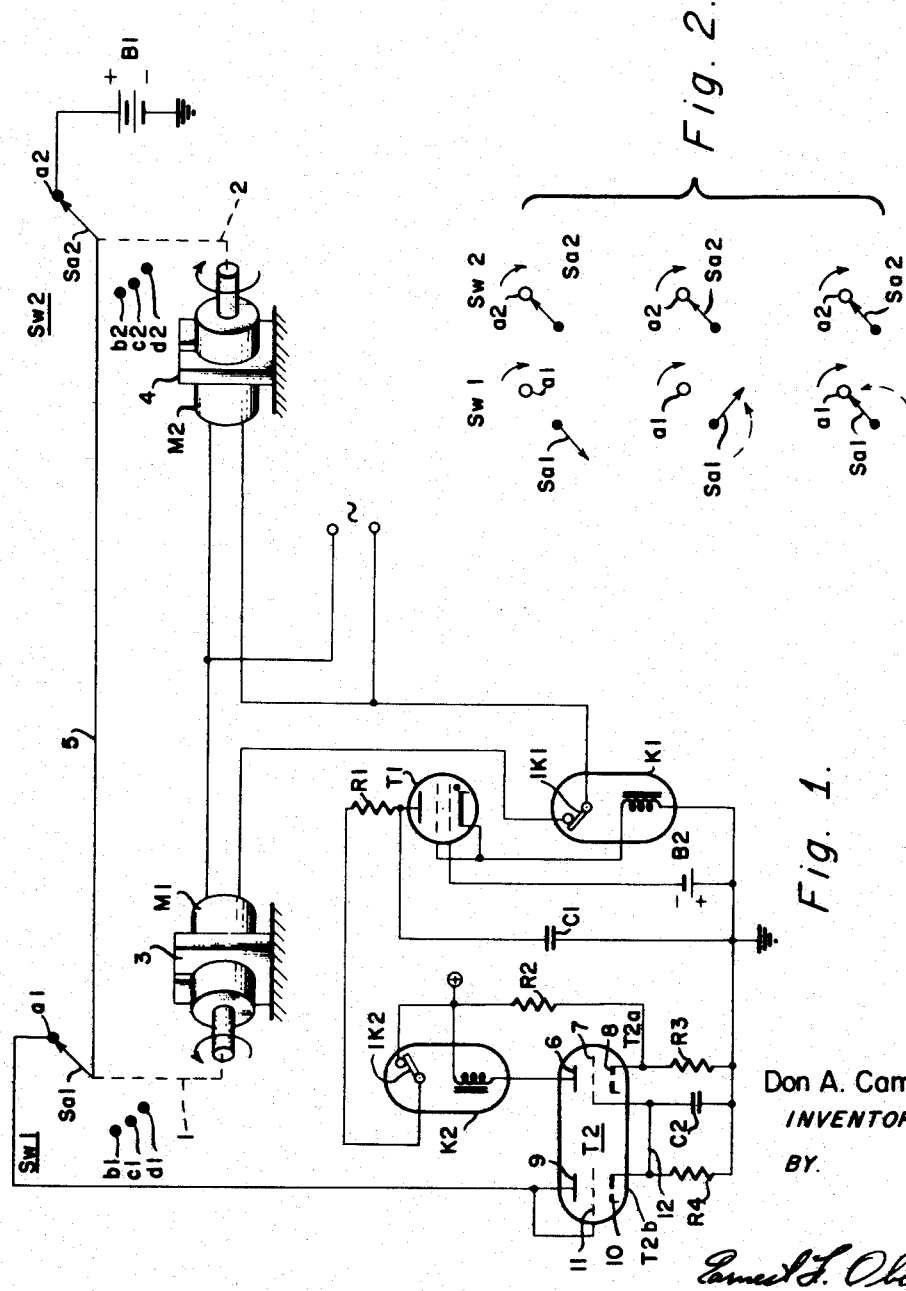

Oct. 3, 1961  D. A. CAMPBELL  3,003,092
ELECTRIC MOTOR CONTROL SYSTEM
Filed Nov. 30, 1959

Don A. Campbell,
INVENTOR.
BY
*Ernest F. Oberle*
AGENT.

United States Patent Office 3,003,092
Patented Oct. 3, 1961

3,003,092
ELECTRIC MOTOR CONTROL SYSTEM
Don A. Campbell, Gardena, Calif., assignor to Hughes Aircraft Company, Culver City, Calif., a corporation of Delaware
Filed Nov. 30, 1959, Ser. No. 856,219
1 Claim. (Cl. 318—41)

This invention relates generally to electric motor control systems and more particularly to an electric control system for synchronizing a pair of motors in predetermined phase relationships.

Control systems of this type are usually employed for controlling a pair of mechanically separated and frequently remotely situated devices which must be maintained in some predetermined positional relationship, either in a linear sense, or, an angular sense.

Various types of control systems have been employed for this purpose. One such system involves the use of direct current motors, one of which is referred to as the "master" and the other the "slave." Each motor is provided with a suitable device for sensing angular position. Typical of such devices are alternating current angular displacement detectors, sometimes referred to as synchro transmitters and receivers. The transmitter is mechanically driven by the master motor and the receiver is mechanically driven by the slave motor. The outputs of the two synchro units are compared in phase detector circuits and the phase angle difference between the output of the transmitter and the output of the receiver is employed to control the input of energy to the slave motor.

In this arrangement, the slave motor is controlled entirely by the angular position error between the two motors and all the power for controlling the slave motor must be derived as a function of this position error.

Later improvements in this system resulted in an organization wherein the master and slave motors were simultaneously speed regulated and the position error superimposed on the speed regulation for the slave motor, the theory in this instance being that it is materially easier to control the phase relationship of two motors which are operating at approximately the same speed than it is to supply all of the power for controlling one motor as a function of the position error, as in the preceding case.

Further improvements in circuits of this type stemmed from the use of a differential type of synchro unit connected between the synchro transmitter and receiver for the purpose of shifting the phase of the output voltage of the transmitter as it is applied to the receiver, to thereby permit operation of the slave motor at some synchronous speed with the master motor in some predetermined phase displaced angular relationship.

In less sophisticated types of controls, such simple expedients as stepping switches have been employed which are stepped in predetermined angular increments with each energization of the electromagnetic drives therefor. The simultaneous application of pulses to such devices, assuming no malfunction, results in simultaneous stepping of the switches among corresponding switch contacts, providing a type of synchronous operation.

There are many applications of such control systems which do not require the high degree of control sophistication afforded by the direct current motor types of systems referred to hereinabove and which yet require higher operating speeds and greater reliability than the stepping switch type of synchronous control affords.

Accordingly, it is one object of this invention to provide an electric motor control system of the character referred to which is simple with respect to operational requirements and positive in operation.

Another object of this invention is to provide a motor control system of the character referred to which requires no special phase sensing equipment.

Still another object of this invention is to provide a control system for synchronizing a pair of motors wherein synchronous operation in some predetermined phase relationship is obtained by momentarily de-energizing one of the motors.

A specific object of this invention is to provide a simplified type of phase synchronizing motor control system, employing motors which tend to synchronize in one of several phase relationships with respect to the line voltage.

The objects aforesaid are accomplished, according to one embodiment of this invention, in a motor control system employing a pair of similar synchronous motors adapted for alternating current energization and each having the characteristic of synchronizing in any one of several phase relationships with reference to the line voltage. Provision is made for simultaneously energizing these motors, which therefore operate at synchronous speed with the line voltage in one of several phase angle relationships. Operation in a selected phase angle relationship is thereafter obtained through momentary de-energization of one of the motors, to cause said one motor to step backwardly or drop behind one phase position with each momentary de-energization until such time as the desired phase relationship is obtained, provision being made to indicate the desired relationship through circuits controlled by rotary switches driven by the respective motors.

Figure 2:
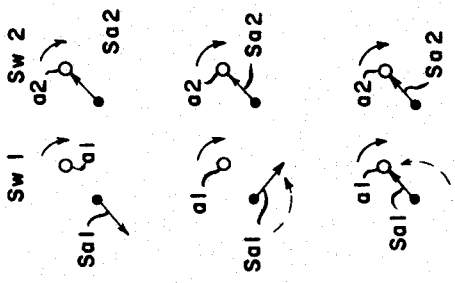

The foregoing statements are merely illustrative of the various aims and objects of this invention. Other objects and advantages will become apparent upon study of the following specification when considered in conjunction with the accompanying drawing in which:

FIG. 1 is a circuit diagram of a motor control system embodying the principles of this invention; and FIG. 2 schematically indicates different synchronizing positions of the motors.

In the arrangement illustrated in FIG. 1, two similar synchronous motors M1 and M2, respectively, are employed. These may be 4 pole reluctance type synchronous motors which are commercially available and which exhibit the property of synchronizing in any one of four phase positions with respect to the supply voltage therefor. The supply voltage in this instance may be a commercial 115 v., 60 cycle supply. The alternating current supply voltage is applied in parallel to the two motors so that the two motors are simultaneously powered and therefore tend to operate at their normal synchronous speeds, which may be of the order of 1800 r.p.m., in one specific application. Each motor drives a rotary type of switch, the respective switches being designated Sw1 and Sw2, the mechanical connections with the switch arms or rotors Sa1 and Sa2, respectively, being indicated by dotted lines 1 and 2, respectively. Suitable collars, not indicated, in the connections of the respective motors and their associated switch rotors may be provided for selectively angularly fixing the switch arms with respect to the motor armatures. Alternatively, provision may be made for rotatably mounting the motor housings as by means of respective clamps 3 and 4.

Each rotary switch may include a plurality of stationary contacts. For the purpose of determining phase synchronization, only one stationary contact on each of the switches is required. These contacts are designated a1 and a2 on the respective switches and are correspondingly angularly indexed. The switch rotors Sa1 and Sa2 may be preset on the motor shafts by examination of the specific angular relation of each contact arm with reference to the associated motor armature or rotor. This may be done either electrically or by actual observation of the relationship between the respective movable contacts and rotors. Precise synchronizing, however, may require the ability to rotate one or both of the motor housings after the movable switch contact arms have been secured to the shafts so that simultaneous engagement of contacts $a1$ and $a2$ on the respective switches may occur, and, further, that the dwell time of the movable contact on the rotor, in passing over the respective stationary contacts, may be identical.

For this purpose, with both of the motors operating at their synchronous speeds, one or both of the motor housings may be rotated in respective clamps 3 and 4, as required, to bring the motors into the desired phase or angular position relationship.

This might simply be accomplished by providing a battery, such as the battery B1, having one terminal, say the positive terminal, connected to the contact $a2$ of switch $Sw2$, and the other terminal thereof grounded. The circuit between the switches may be completed between the movable contact arms by a conductor 5. Contact $a1$ on switch $Sw1$ may be grounded to complete this circuit and a light connected anywhere in series in the circuit may be employed, to indicate by its flashing, that the circuit between the two switches has been completed. Either motor housing may be rotated in the amount required to achieve the necessary phasing of the motors so that the switches are simultaneously closed once each time the motors rotate. Thereafter, the motor housings may be clamped.

An arrangement of this type is satisfactory only in the event that such manual synchronizing is practical for the intended purpose, since, in the absence of other provisions, this synchronizing effort must be made each time the motors are started up. As will be seen by reference to FIG. 2, when initially energized, the motors may synchronize in any one of four possible angular positions with respect to the line voltage and thereafter operate at synchronous speeds. The requirement of the movable switch arms, however, imposes a single angular position for proper operation. To obviate the need for repeated manual adjustments each time the motors are started, this invention provides a simple control circuit controlling the application of the supply voltage to one of the motors, in this instance, the motor M1, to automatically bring the motors into their desired phase relationship at synchronous speeds. The circuit herein illustrated provides for the intermittent interruption of current supplied to motor M1 in a time interval approximately equal to that required for the motor to drop back one phase position with respect to line voltage. This interruption of the motor supply voltage is provided by means of a relay K1 having a set of normally closed contacts 1K1 connected in series in the supply circuit for the motor M1.

Energization of relay K1 is controlled by a gas-filled tube T1, such as a thyratron, forming a part of a relaxation oscillator circuit. To this end, the coil of relay K1 is connected in series in the cathode circuit of tube T1 and is therefore energized each time the tube fires. Tube T1 is energized by a positive voltage supply, say of the order of 180 v., in a circuit which extends through the normally closed contacts 1K2 of a relay K2 and is connected to the plate circuit of tube T1 through a plate resistor R1. Tube T1 is provided with a suppressor grid which is connected directly to the cathode and a control grid which is negatively biased, for instance, by a battery B2. In the circuit arrangement illustrated, the bias is such that upon the application of suitabel plate voltage, the tube may be caused to fire. Control of the plate voltage is obtained by means of a capacitor C1 which is connected in parallel across the series circuit including tube T1 and the relay K1.

It will be seen that upon application of the supply voltage to the plate of tube T1 the capacitor C1 will begin to charge at a rate controlled by resistor R1. When the capacitor charges to a voltage corresponding to the breakdown voltage of the tube T1, the tube ionizes and fires and the capacitor C1 discharges therethrough. In so doing, relay K1 is energized. When the capacitor voltage drops to a level below that which the tube T1 will remain conducting the tube cuts off. At cut off, relay K1 drops out. The time constant of the conducting cycle of the tube T1 is selected, by suitably matching the reactance of relay K1 and the reactance of the capacitor, so that relay K1 may be energized an interval sufficient to permit the synchronous motor M1 to step back one phase position before relay K1 is again de-energized, closing contacts 1K1, to again establish the energizing circuit for the motor M1. The charging cycle of the capacitor as earlier indicated is controlled by the resistor R1 and is selected to provide settling time for the motor at synchronous speed before it is again energized.

An additional consideration is involved in selecting the time constant of the circuit involving capacitor C1 and resistor R1. This concerns a synchronism detector circuit yet to be described. It is sufficient to note at this point that when synchronism is reached the charging time of capacitor C1 must be sufficiently long that the detector circuit may de-energize the oscillator circuit before the oscillator tube can again fire.

In the circuit arrangement herein illustrated, the resistor R1 may be 2.7 megohms and the capacitor C1, one microfarad. Tube T1 may be of the type identified 2D21.

The operation of the relaxation oscillator continues until such time as the contacts 1K2 of relay K2 are opened. Relay K2 is under the control of the triode portion T2$a$ of a twin triode generally designated T2. In the circuit illustrated, the coil of relay K2 connects plate 6 of the triode amplifier T2$a$ directly to the positive supply voltage indicated. The cathode 8 is biased by a voltage derived from a voltage divider network connected between the positive voltage supply and ground, and which includes resistors R2 and R3, the cathode 8 being connected into this voltage divider at the common terminal between the resistors. Grid 7 of triode amplifier T2$a$ is connected to ground through a capacitor C2 and a resistor R4.

The other half of tube T2, also indicated as a triode, and designated T2$b$, includes a plate 9, a cathode 10, and a grid 11. This section of the tube functions as a diode detector in which the grid is connected directly to the plate. The cathode 10 is grounded through a cathode resistor R4 and a cathode to grid connection between the detector cathode 10 and amplifier grid 7 is provided by means of a circuit 12. Plate 9 of this detector is connected directly to contact $a1$ of rotary switch $Sw1$.

Operation of the system requires preliminary adjustment of the relative positions of the rotary arms of the two switches. With the apparatus illustrated after the motors have been energized and with the aid of, say, a variable frequency stroboscopic device, one or both of the motor housings may be rotated until the switch arms or rotors $Sa1$ and $Sa2$ coupled to the motor armature shafts, are either parallel or perpendicular when the motors are operating at synchronous speeds. The motors are then clamped in this position by means of clamps 3 and 4 illustrated. When the motors are turned on after this initial orientation the switch rotors have one chance in four of locking in at the correct phase, assuming that each of the motors will lock into one of four phase positions with respect to the line voltage.

If it is assumed, as shown in FIG. 2, that the switch rotors are initially 180 degrees out of phase, the operation of the oscillator circuit including the tube T1 will be such as to interrupt the motor supply for the motor M1 to step the motor back through the successive synchronizing positions until such time as the switch arms or rotors $Sa1$ and $Sa2$ simultaneously engage the respective stationary contacts $a1$ and $a2$. At this point, plate voltage is supplied to the detector T2b which immediately conducts. Conduction of the detector charges condenser C2. As the voltage on condenser C2 increases a point is reached where the bias on the grid 7 of the triode amplifier T2a causes conduction which energizes relay K2. Energization of relay 1K2 opens contacts 1K2 to interrupt the power supply for oscillator tube T1, preventing further energization of relay K1. Contacts 1K1 now remain closed, thus providing a continuous supply of energy to the motor M1 to maintain the phase synchronized operation desired. The time constants of the discharge loop for the condenser C2, which includes resistor R4, are selected so that the repetitive application of energy to capacitor C2 is sufficient to maintain the capacitor voltage, and, hence, the bias voltage on grid 7 of the triode amplifier T2a, to maintain the amplifier in energized condition, in turn maintaining relay K2 energized.

When the motors are stopped, depending upon the character of their loads, the motors may or may not stop in corresponding angular positions. Hence, upon reenergization of the motors, the motors may again operate synchronously in some phase other than the desired phase relation, in which case operation of the synchronizing circuit will again take place to control motor M1 in such sense that the desired phase relationship in synchronous operation is achieved.

Rotary switches such as Sw1 and Sw2 may be provided with additional contacts if desired such as the contacts b1, c1, d1 on switch Sw1 and corresponding contacts b2, c2, d2 on switch Sw2. Whence connection of both switch arms Sa1 and Sa2 to corresponding contacts, such as b1 and b2 on the respective switches is effective to establish a circuit therebetween through the conductor 5 for the purpose of transmitting electrical energy therebetween, the arrangement providing circuit isolation among the several stationary contact points.

What is claimed is:

An electric motor control system, comprising: a pair of synchronous motors; input circuits connected with both of said motors for simultaneously energizing said motors with alternating current voltage; phase synchronizing switch means including a pair of rotary switches, each having contacts closed in a single switch position, respectively connected to said motors and operated by said motors; a first electric switch having a coil and having contact means connected in series in one of said input circuits; a gas tube having a plate, grid and cathode; a second electric switch having a coil and having normally closed contact means; a direct current source; a circuit connecting said normally closed contact means of said second electric switch, said gas tube and said coil of said first electric switch in series across said direct current source; a capacitor connected across said gas tube and said coil of said first electric switch; a bias voltage circuit connected to said grid of said gas tube and applying bias voltage thereto causing said tube to conduct when the voltage on said capacitor is sufficiently high; said tube firing and cutting off with charging and discharging of said capacitor, correspondingly energizing and deenergizing said first electric switch and opening and closing said contact means therefor to open and close said one input circuit; a second tube connected in series with said coil of said second electric switch across said direct current source and having a grid circuit including a grid circuit capacitor connected in series therein; a second source of direct current; a unidirectional current conducting device; and a circuit connecting said contacts of said rotary switches, said unidirectional current conducting device and said grid circuit capacitor in series across said second source of direct current to charge said grid circuit capacitor and cause said second tube to conduct when said contacts of both of said rotary switches are closed, whereby said second electric switch is energized, deenergizing said gas tube and said first electric switch, closing said one input circuit.

References Cited in the file of this patent

UNITED STATES PATENTS

| 2,406,853 | Richardson et al. | Sept. 3, 1946 |
| 2,476,873 | Jeffers | July 19, 1949 |
| 2,848,671 | McDonald | Aug. 19, 1958 |